Nov. 14, 1961 J. M. FRAME 3,008,684
QUICK OPENING PACKLESS VALVE
Filed Dec. 19, 1958
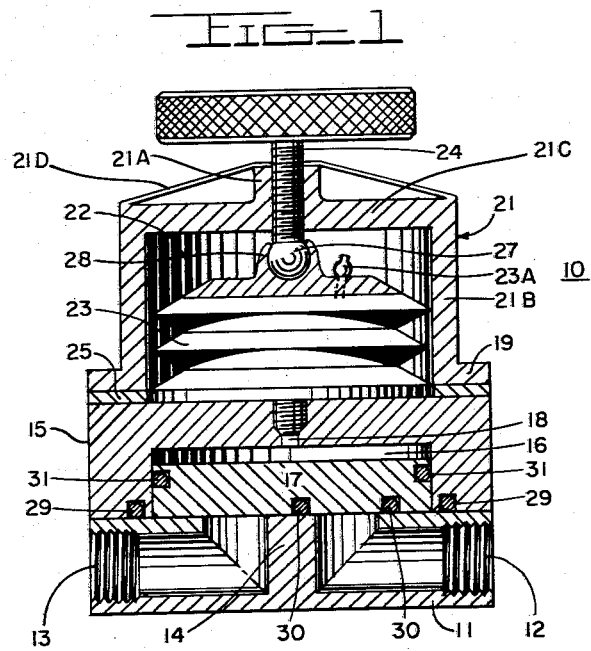
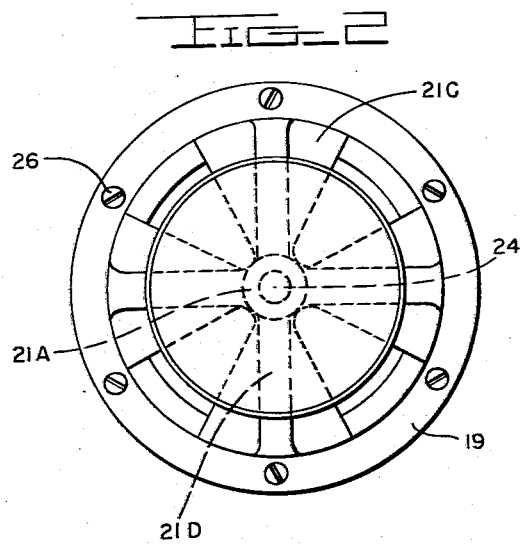
INVENTOR
JAMES M. FRAME
BY *Richard C. Reed*
ATTORNEY

United States Patent Office 3,008,684
Patented Nov. 14, 1961

3,008,684
QUICK OPENING PACKLESS VALVE
James M. Frame, Forestville, Md.
(5010 Forestville Road, Washington 28, D.C.)
Filed Dec. 19, 1958, Ser. No. 781,812
1 Claim. (Cl. 251—57)
(Granted under Title 35, U.S. Code (1952), sec. 266)

The invention described herein may be manufactured and used by or for the Government of the United States of America for governmental purposes without the payment of any royalties thereon or therefor.

The present invention relates to packless valves and more particularly to a quick opening packless valve to provide maximum pressure instantaneously for handling harmful radioactive or toxic fluids, or any other fluid to be controlled by a valve.

Heretofore, packless valves have been developed in which the valve action is positively controlled by a valve stem. Thus the pressure on the valve to hold it closed depends on the pressure supplied by the valve stem and opening of the valve depends on the distance through which the valve stem is turned. Since the valve stem is positively connected to the valve, the time required to completely open the valve depends on the time required to turn the valve stem through its maximum distance. In various operations, it is desired to operate at full pressure as quickly as possible and to be able to hold the valve closed with minimum pressure. The present invention is adapted to provide control over a valve wherein the valve can be easily closed, held in a closed position with minimum pressure and opened quickly to provide maximum pressure instantaneously.

It is therefore an object of the present invention to provide a quick opening packless valve suitable to control harmful as well as unharmful fluids.

Another object is to provide an inexpensive, efficient and reliable valve which is simple of construction and easy to assemble and disassemble for repairs, if necessary.

Still another object is to provide a quick opening valve requiring a minimum rotation of the operating wheel and stem from full closed to full open.

Yet another object is to provide a free floating valve which is free to move without any connections thereto.

Other objects and advantages of the invention will hereinafter become more fully apparent from the following description of the annexed drawing, which illustrates a preferred embodiment and wherein:

FIG. 1 illustrates a cross section of a preferred embodiment of the invention; and FIG. 2 is a top plan view of the device.

The valve of the present invention comprises three separate sections, an inlet and outlet port section; a valve section and a bellows or valve actuation section. A partition between the valve section and the bellows section is provided with an axially disposed aperture which permits air pressure or any other suitable fluid pressure medium to be transmitted between the valve section and the bellows section. A disc shaped valve is positioned in the valve section for axial movement during operation to open and close the inlet port, and a bellows which is closed off at the top portion and open at the bottom to permit passage of pressure through the aperture is positioned in the bellows section and air pressure or any other suitable medium is provided within the bellows and above the valve to exert a pressure on the valve. A threaded bolt or shaft which passes axially through the bonnet is rotatably connected to the bellows at the top thereof and adapted for movement relative thereto to exert a pressure on the bellows by a handle on the outside of the valve structure. Application of a force on the bellows through operation of the shaft exerts or releases pressure on the valve to open and close the valve, as desired.

Now referring to the drawing, there is shown in FIG. 1, a cross sectional view of a preferred embodiment of the invention comprising a valve 10 which comprises a lower section 11 including a threaded inlet 12 and a threaded outlet 13, disposed opposite to each other and separated by a wall 14. A middle section 15 has a recess therein to form a cavity 16 for reception of a valve 17, and an axially disposed aperture 18 therein which leads upwardly from the recessed portion to the outside of the middle section into a bonnet section 21. The bonnet 21 is positioned above the middle section with an outturned lip 19 along the bottom edge for securing the bonnet in place. The bonnet includes an open space 22 therein for reception of an extensible and contractable bellows 23 of any suitable construction and an axially disposed threaded sleeve 21A in the top for reception of a threaded shaft or bolt 24.

The bonnet 21 is formed as a cylinder 21B with four ribs 21C at the top portion extending inwardly to the threaded sleeve 21A for reception of bolt 24. The sleeve is supported at the top thereof by supports 21D that are attached at the cylindrical portion.

The bellows is open at the bottom end and has a portion 25 turned outwardly therefrom which is secured between the bonnet and the mid-section by bolts 26 to hold the bellows in place. Bolts 26 pass through the mid-section and are received by threaded holes in the lower section to secure the valve sections 11, 15 and 21 together. The bellows is connected at the top to shaft 24 by any suitable means such that the end of the shaft will rotate freely within the connection without any rotational movement of the bellows. The bellows is provided with a valve 23A at the top portion thereof for the purpose of applying the required pressure in the bellows above the valve, that is if pressure above atmospheric is required.

A suitable arrangement for securing the end of the shaft to the bellows is shown as a ball and socket joint in which the end of the shaft is formed as ball 27. The ball is held in position by fingers 28 on the upper surface of the bellows bent upwardly and around the upper surface of the ball 27 to form the socket. The fingers provide a loose fit for the ball to permit rotation thereof while the bellows remain stationary. Thus rotation of the shaft for a downward movement of the ball will apply a pressure to the bellows and rotation for upward movement will decrease the pressure in bellows 23.

In an alternative form, the bellows can be made with a plate at the bottom which is provided with a fitting at the center thereof which is screw threaded into the aperture 18 to position and hold the bellows in place. The fitting is provided with an aperture therein to provide passage of a fluid into and from the bellows to the cavity 16 above the piston. The top of the bellows connects to the ball in the same manner as the previously described bellows ball and socket arrangement.

The valve 17 is provided with appropriate O-ring seals to prevent leakage between the parts. O-ring seal 29 is provided between the lower section 11 and the middle section 15 to prevent any outside leakage. O-ring seal 30 is provided in the bottom surface of the valve 17 such that the seal surrounds the inlet opening to prevent leakage when the valve is in a closed position. O-ring seal 31 is situated about the circumference of the valve and contacts the side walls of the recess in the middle section to prevent any leakage into the pressure area above the valve 17 and to prevent pressure leakage from above the valve into the pressure system.

It is to be noted that the top surface area of valve 17 is much greater than the bottom surface area against which the system pressure acts when the valve is in a closed position. Thus the pressure required to hold the valve closed is much less than the system pressure and can be determined by the area circumscribed by O-ring seal 30 divided by the area circumscribed by O-ring seal 31, multiplied by the system pressure. This means the pressure required to hold the valve closed is only a fraction of that required to close the valve. This prevents accidental closing of the valve and permits the valve to stand in a closed position for long periods of time with very little strain on the bellows.

In assembly of the valve, the bellows is positioned in the bellows section 21 such that the shaft is withdrawn from the section as far as possible. Sections 11, 15 and 21 are aligned and with the bottom extension of the bellows positioned between the lip 19 and the top of section 15, bolts 26 are inserted through the holes and screwed into section 11. Since the shaft is withdrawn as far as possible, the bellows will be extended for its maximum extension and thereby the bellows will have atmospheric pressure in the bellows when the valve is assembled. If a pressure greater than atmospheric is desired, the pressure is supplied through the pressure valve 23A at the top of the bellows after the valve 10 has been assembled. Suitable space is provided between the ribs 21C to afford access to the pressure valve 23A.

In operation, assuming the screw is set for the bellows to provide sufficient pressure above the valve to maintain the valve in a closed position for the desired system pressure, the valve is placed in the system and will prevent any flow through the valve. On opening the valve the pressure in the bellows is released by operation of the screw and the system pressure acting over the area circumscribed by O-ring seal 30 overcomes the pressure above the valve and breaks the seal to force the valve open. As soon as the valve has the slightest opening, the pressure area on the bottom surface of the valve acted upon by the system fluid increases thereby increasing the pressure on the bottom of the valve. This pressure increase is instantaneous and thereby snaps the valve open instantly to provide a quick opening of the valve. The system pressure will keep the valve open until closed again by operation of the screw against the bellows. In closing the valve, the bellows is acted upon by the screw to partially collapse the bellows to increase the pressure on the upper surface of the valve until the pressure exceeds that of the system. When the system pressure has been exceeded, the valve will close, forcing O-ring seal 30 against the seat. Immediately upon closing the valve, the pressure area on the top of the valve is greater than the system pressure contacted area on the bottom surface of the valve which requires much less pressure on the top surface of the valve to maintain the valve in a closed position. Consequently, the pressure in the bellows and cavity above the valve can be lowered to a much lower value to hold the valve in the sealed position and to preserve the bellows. This can be done by backing off the screw which applies the collapsing pressure to the bellows.

It can be seen from the above operation that the bellows and screw could be replaced by a fluid pressure line connected to the aperture 18 and pressure applied to the top surface of the valve from a remotely located station. Such a remote operation would permit one operator to control any number of different valves for different operations or in different locations in any selected areas.

The present invention provides a quick opening valve which can be used in a system that handles dangerous fluids without any fear of harmful effects on personnel due to leakage or failure of operation. Also, it requires greater pressure to close the valve than it does to hold the valve closed or to open the valve thereby providing safeguard against accidental closure.

Obviously many modifications and variations of the present invention are possible in the light of the above teachings. It is therefore to be understood that within the scope of the appended claims the invention may be practiced otherwise than as specifically described.

What is claimed is:

A quick opening packless valve comprising a valve casing, inlet and outlet ports therein, a cavity in said casing adjacent to said ports and communicating therewith, a valve free of any supporting connections adapted for axial movement in said cavity, a chamber separated from said cavity by a partition, an axially disposed aperture through said partition communicating between said cavity and said chamber, an extensible and collapsible bellows secured within said chamber with an opening communicating with said aperture, said bellows and cavity forming a closed chamber containing a force transmitting fluid, an axially disposed screw threaded through the casing and extending into said chamber and rotatably connected with said bellows, said screw adapted to apply pressure to compress said bellows to apply fluid pressure to said valve to close said inlet port, said valve comprising O-ring seals engaging respectively the adjacent cavity side walls and the adjacent wall of said casing about said inlet port to prevent leakage from said inlet port into said cavity and said valve presenting a larger surface area to said fluid pressure from said bellows than to the inlet pressure when the valve is in a closed position.

References Cited in the file of this patent

UNITED STATES PATENTS

| 874,106 | McCarroll | Dec. 17, 1907 |
| 1,805,802 | Browne | May 19, 1931 |
| 1,920,068 | Elian | July 25, 1933 |
| 2,908,290 | Peters | Oct. 13, 1959 |

FOREIGN PATENTS

| 972 | Great Britain | Apr. 5, 1865 |